United States Patent
Crochet

(10) Patent No.: US 11,493,045 B2
(45) Date of Patent: Nov. 8, 2022

(54) DRY VACUUM PUMP WITH AT LEAST ONE SEALING DEVICE WITH A DEFLECTOR

(71) Applicant: PFEIFFER VACUUM, Annecy (FR)

(72) Inventor: Stephane Crochet, Rumilly (FR)

(73) Assignee: PFEIFFER VACUUM, Annecy (FR)

( * ) Notice: Subject to any disclaimer, the term of this patent is extended or adjusted under 35 U.S.C. 154(b) by 148 days.

(21) Appl. No.: 16/964,813

(22) PCT Filed: Feb. 14, 2019

(86) PCT No.: PCT/EP2019/053734
§ 371 (c)(1),
(2) Date: Jul. 24, 2020

(87) PCT Pub. No.: WO2019/170386
PCT Pub. Date: Sep. 12, 2019

(65) Prior Publication Data
US 2021/0054843 A1    Feb. 25, 2021

(30) Foreign Application Priority Data
Mar. 7, 2018    (FR) ...................................... 18 51969

(51) Int. Cl.
*F04C 27/00*    (2006.01)
*F16C 33/78*    (2006.01)
(Continued)

(52) U.S. Cl.
CPC ............ *F04C 27/009* (2013.01); *F04C 25/02* (2013.01); *F04C 29/028* (2013.01);
(Continued)

(58) Field of Classification Search
CPC ...... F04C 27/009; F04C 18/126; F04C 25/02; F04C 29/028; F04C 2220/12;
(Continued)

(56) References Cited

U.S. PATENT DOCUMENTS

| | | | |
|---|---|---|---|
| 6,287,100 B1 | 9/2001 | Achtelik et al. | |
| 6,688,864 B2 | 2/2004 | Yamamoto et al. | |
| 2002/0168279 A1 | 11/2002 | Yamamoto et al. | |

FOREIGN PATENT DOCUMENTS

| | | | | |
|---|---|---|---|---|
| CN | 102282371 A | * | 12/2011 | ............ F01C 19/005 |
| CN | 102282371 A | | 12/2011 | |

(Continued)

OTHER PUBLICATIONS

International Search Report dated May 14, 2019 in PCT/EP2019/053734 filed on Feb. 14, 2019, 3 pages.
(Continued)

*Primary Examiner* — Mary Davis
(74) *Attorney, Agent, or Firm* — Oblon, McClelland, Maier & Neustadt, L.L.P.

(57) ABSTRACT

A dry vacuum pump is provided, including an oil sump; a pumping stage; two rotating shafts respectively holding a rotor extending in the pumping stage, the rotor being configured to rotate in a synchronised manner in opposite directions in order to carry a gas to be pumped between an intake and a discharge of the pump, the two rotating shafts being supported by bearings lubricated by a lubricant contained in the oil sump; and a lubricant sealing device inserted between the oil sump and a pumping stage at each shaft passage, the sealing device including a disc-shaped deflector mounted on a shaft of the two rotating shafts for rotation therewith, and a disc of the deflector has an annular end on a periphery thereof, extending towards the pumping stage, forming a retaining recess.

10 Claims, 5 Drawing Sheets

(51) Int. Cl.
*F16C 33/80* (2006.01)
*F04C 25/02* (2006.01)
*F04C 29/02* (2006.01)

(52) U.S. Cl.
CPC ........ *F16C 33/7896* (2013.01); *F16C 33/805* (2013.01); *F04C 2220/12* (2013.01); *F04C 2240/50* (2013.01); *F04C 2240/605* (2013.01)

(58) Field of Classification Search
CPC ............ F04C 2240/50; F04C 2240/605; F16C 33/7886; F16C 33/805
See application file for complete search history.

(56) References Cited

FOREIGN PATENT DOCUMENTS

| CN | 204357705 U | 5/2015 | |
|---|---|---|---|
| DE | 20 2014 010 177 U1 | 5/2016 | |
| EP | 1 236 901 A2 | 9/2002 | |
| EP | 0 993 553 B1 | 6/2004 | |
| JP | 62-186073 A | 8/1987 | |
| WO | WO-2009024370 A1 * | 2/2009 | ............ F04C 27/009 |

OTHER PUBLICATIONS

Combined Chinese Office Action and Search Report dated Feb. 18, 2022, in corresponding Chinese Patent Application No. 201980016478.4 (with English Translation and English Translation of Category of Cited Documents), 15 pages.

The First Office Action dated Jul. 6, 2022 in corresponding Taiwanese Patent Application No. 108106000, with English translation. (18 pages).

The Second Office Action dated Aug. 10, 2022 in corresponding Chinese Patent Application No. 201980016478.4, with English translation. (14 pages).

* cited by examiner

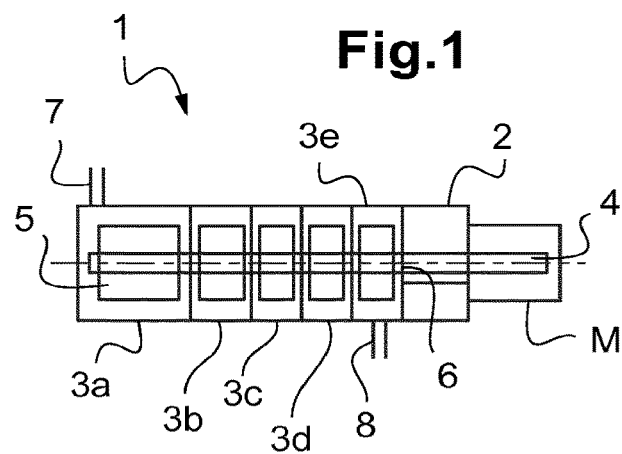
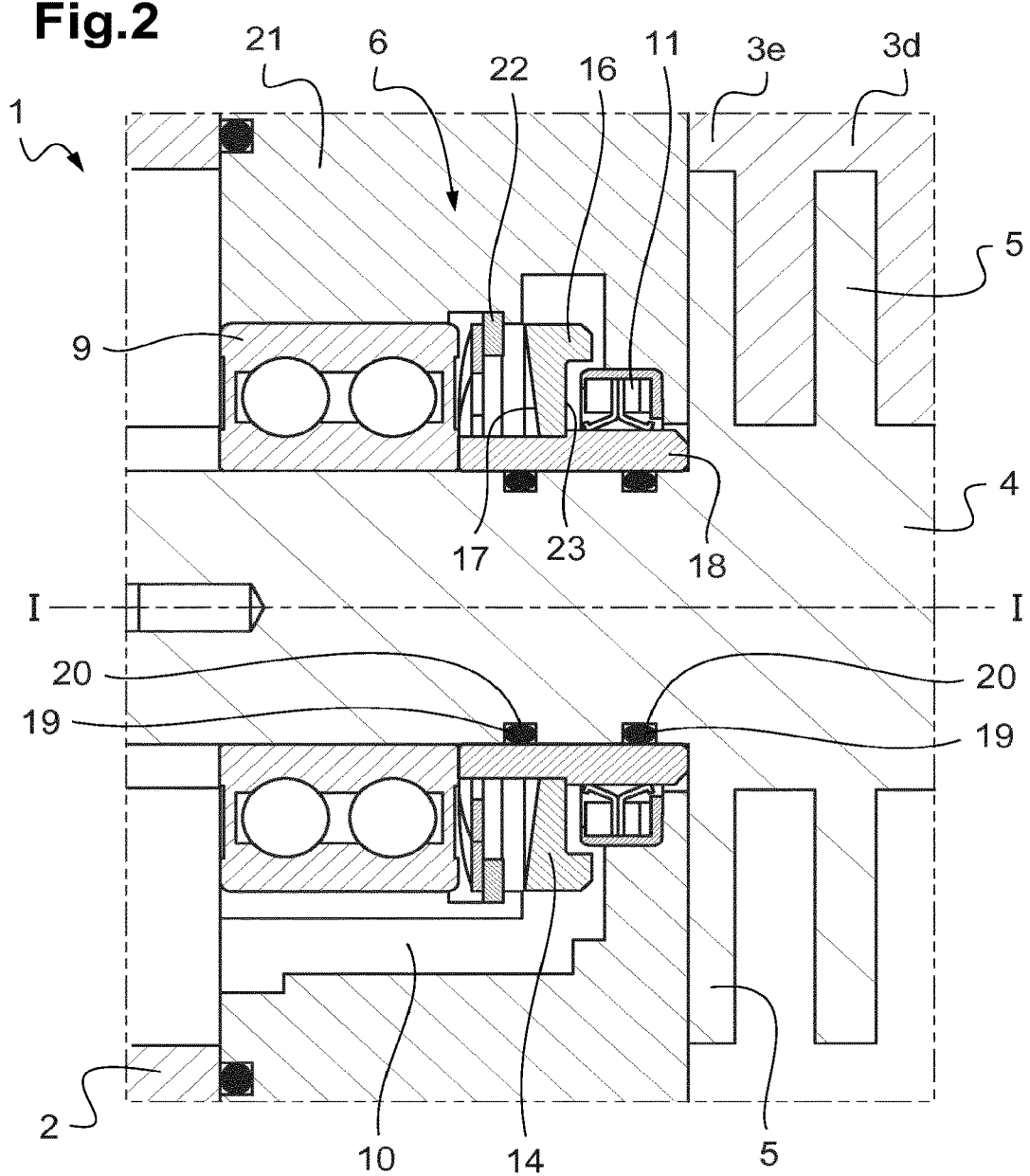

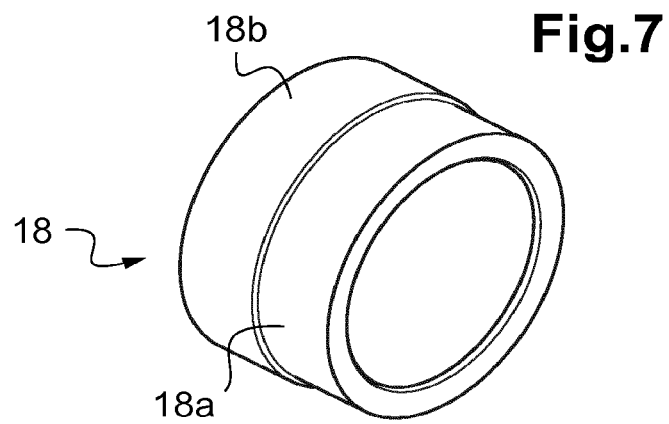
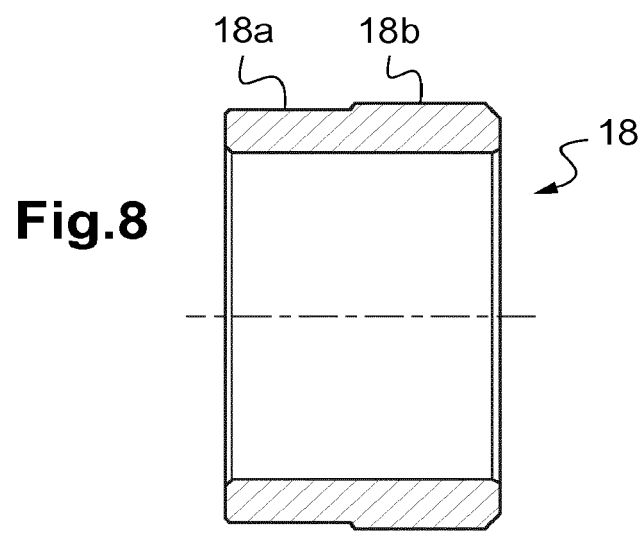

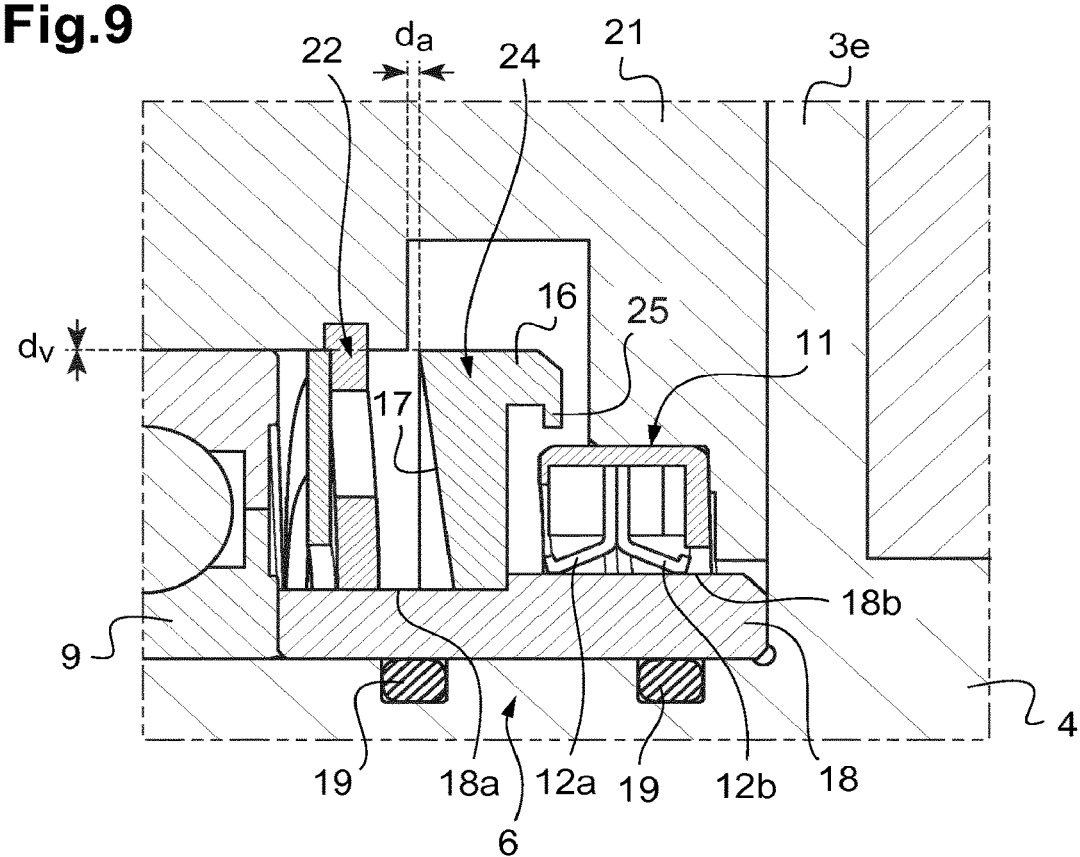
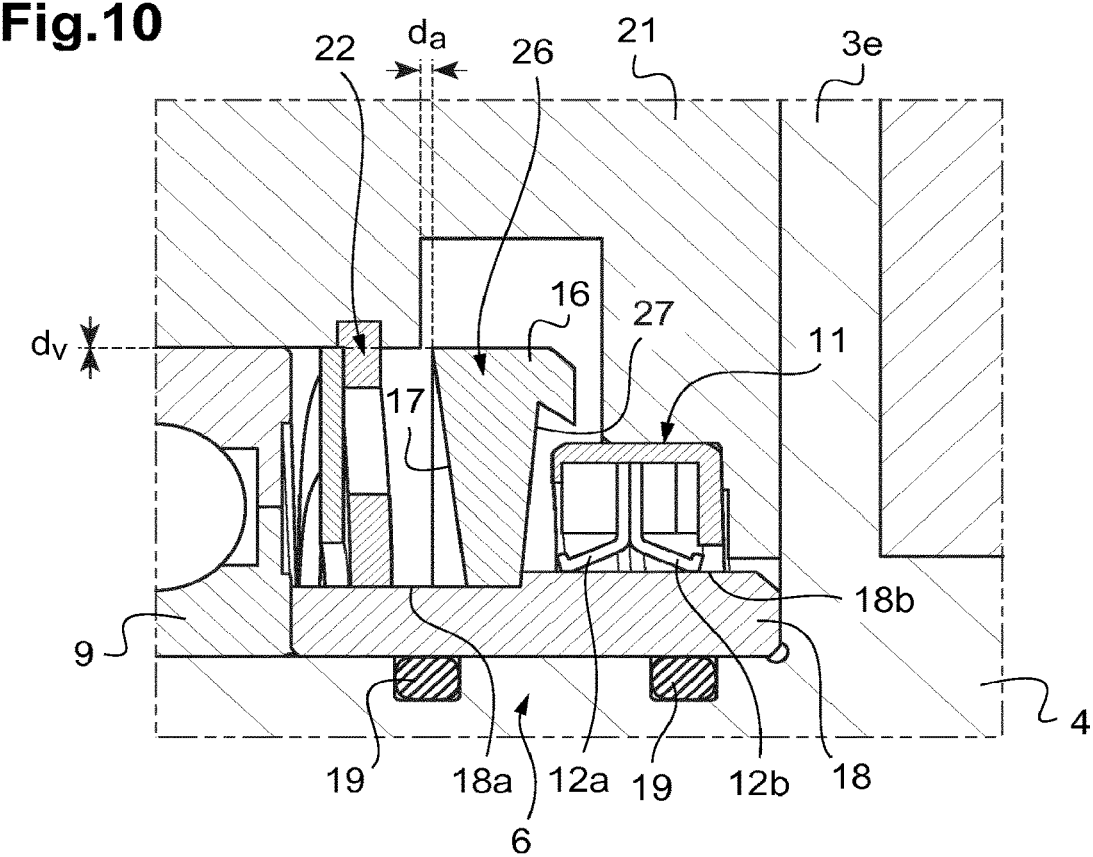

DRY VACUUM PUMP WITH AT LEAST ONE SEALING DEVICE WITH A DEFLECTOR

The present invention relates to a dry vacuum pump such as a Roots, claw or screw pump. The invention relates more particularly to the lubricant-tightness of the vacuum pump.

Dry rough-vacuum pumps comprise one or more pumping stages in series, in which flows a gas to be pumped between an intake and a discharge. A distinction is made among the known rough-vacuum pumps between rotary lobe pumps also known by the name Roots, with two or more lobes, claw pumps and screw pumps. Roots blower vacuum pumps are also known, which are used upstream of the rough-vacuum pumps to increase the pumping capacity in high flow situations. These vacuum pumps are referred to as "dry" because during operation, the rotors rotate inside the stator without any mechanical contact between them or with the stator, which makes it possible not to use oil in the pumping stage.

The rotating shafts are supported by ball bearings that are lubricated with oil. During operation, the rotation of the shafts in the bearings generates contaminants such as drops of oil which, when they are subjected to pressure variations, can migrate towards the pumping stage. However, it is vital that there are no traces of oil in the pumping stage for so-called "dry" applications, such as semi-conductor substrate manufacturing processes. The lubricated bearings must therefore be isolated from the dry pumping stage by sealing means through which the shafts are still capable of rotating.

The sealing means used mainly include physical barriers such as flanges on bearings, friction joints, ejector discs, gas bleeders, oil traps such as expansion and condensation chambers or obstacles such as labyrinths and chicanes. These solutions mainly attempt to block or restrict oil migration. However, during operation, the pressures applied in the vacuum pumps can fluctuate significantly and generate propelling forces between the lubricated bearings and the pumping stages capable of carrying contaminating particles from the pumping stages to the oil sump, as well as oil mist or vapour from the bearings to the pumping stages, particularly in applications in which a volume of gas is cyclically evacuated.

Restricting the migration of solid or liquid particles from the pumping stages or friction joints to the oil sump is particularly sought, as these particles, which are sometimes abrasive, can result in the deterioration of the lubricating properties, which can result for example in premature wear of the ball bearings.

An object of the present invention is therefore to propose a dry vacuum pump that at least partially remedies the drawbacks of the prior art.

To this end, the invention relates to a dry vacuum pump comprising:
at least one oil sump,
at least one pumping stage,
two rotating shafts respectively holding at least one rotor extending in the at least one pumping stage, the rotors being configured to rotate in a synchronised manner in opposite directions in order to carry a gas to be pumped between an intake and a discharge of the vacuum pump, the shafts being supported by bearings lubricated by a lubricant contained in the oil sump,
at least one lubricant sealing device inserted between the oil sump and a pumping stage at each shaft passage, the sealing device comprising a generally disc-shaped deflector mounted on the shaft for rotation therewith,
characterised in that the disc of the deflector has an annular end on its periphery extending towards the pumping stage, forming a retaining recess.

The retaining recess of the deflector makes it possible to retain any particles or dust that might come from the pumping stages of the vacuum pump or from the friction joints and would be ejected radially by the deflector. The progress of the particles towards the ball bearings or oil sump is thus restricted.

The lifespan of the bearings can then be increased and the contamination of the oil can be reduced, which makes it possible to reduce oil consumption. A reduction in oil consumption in the order of 30% and "clear" oil almost entirely free from contaminating particles, have thus been able to be observed after 1,000 operating hours of a vacuum pump containing such a deflector.

The deflector made in this way is simple to manufacture and inexpensive. In addition, it is compatible with different types of "dynamic" or friction ring seals of the sealing device.

The vacuum pump can comprise a single oil sump. This oil sump can be arranged next to the so-called low-pressure pumping stage or next to the so-called high-pressure pumping stage on a multi-stage vacuum pump. On the other side, the bearings can be lubricated with grease.

The vacuum pump can also comprise two oil sumps. These oil sumps are arranged respectively at one end of the vacuum pump, i.e. one of them next to the so-called high-pressure stage and one of them next to the so-called low-pressure stage on a multi-stage vacuum pump. On a single-stage vacuum pump, such as a Roots blower vacuum pump, the oil sumps are arranged on either side of the single pumping stage.

The annular end can be of any shape. It can be bevelled.

According to one embodiment, the annular end has generally cylindrical shape, coaxial with the axis of rotation of the shaft.

The annular end can also have a radial rim. The radial rim makes it possible to improve the particle or dust retention capacity of the retaining recess.

The sealing device can comprise a ring seal, such as a friction ring seal or a dynamic seal. The friction ring seal comprises for example a single- or double-lip ring. The dynamic seal comprises for example a segmented seal.

According to one embodiment, the annular end of the deflector extends at least partially around the ring seal.

According to one embodiment, the sealing device comprises a sleeve mounted on the shaft, the deflector being mounted on the sleeve.

The sleeve has for example a two-stage cylindrical shape, including a first cylindrical stage the outer diameter of which is suitable for being inserted into a central orifice in the deflector and a second cylindrical stage forming an axial stop for the deflector.

The face of the disc bearing the annular end can be perpendicular to the axis of rotation of the shaft. According to another embodiment, the face of the deflector bearing the annular end has a general truncated cone shape, coaxial with the centre of the deflector and the outside of the truncated cone faces towards the oil sump. This truncated cone shape makes it possible to guide the return to the pumping stage of any particles or dust that might come from the pumping stage that are not trapped in the retaining recess.

The face of the disc opposite the face bearing the annular end can be perpendicular to the axis of rotation of the shaft. According to another embodiment, the face opposite the face bearing the annular end has a truncated cone shape, coaxial with the centre of the deflector and the outside of the truncated cone faces towards the pumping stage. This truncated cone shape of the deflector in rotation makes it possible to guide the return to the oil sump of any splashes of lubricant hitting the deflector.

In addition, provision can be made for an axial distance of less than 3 mm and a vertical distance of less than 3 mm to separate a stator of the vacuum pump from an edge of the face of the deflector opposite the face bearing the annular end. The passage thus formed is very narrow between the stator and the deflector. It permits the relative expansion of the parts without the parts touching each other, while creating low conductance for the lubricants, thus restricting the migration thereof beyond the deflector.

The invention also relates to a dry vacuum pump comprising:

at least one oil sump,
at least one pumping stage,
two rotating shafts respectively holding at least one rotor extending in the at least one pumping stage, the rotors being configured to rotate in a synchronised manner in opposite directions in order to carry a gas to be pumped between an intake and a discharge of the vacuum pump, the shafts being supported by bearings lubricated by a lubricant contained in the oil sump,
at least one lubricant sealing device inserted between the oil sump and a pumping stage at each shaft passage, the sealing device including a generally disc-shaped deflector mounted on the shaft for rotation therewith,
characterised in that the disc of the deflector comprises at least one face having a truncated cone shape coaxial with the centre of the deflector.

One face of the deflector having a truncated cone shape can be the face opposite the pumping stage, the outside of the truncated cone shape facing towards the oil sump. This truncated cone shape makes it possible to guide the return to the pumping stage of any particles or dust that might come from the pumping stage.

One face of the deflector having a truncated cone shape can be the face opposite the oil sump, the outside of the truncated cone shape facing towards the pumping stage. During operation, the "re-entrant" truncated cone shape of the deflector in rotation makes it possible to guide the return to the oil sump of any splashes of lubricant hitting the deflector.

Both faces of the deflector can have a truncated cone shape.

Further advantages and features will become apparent on reading the description of the invention, together with the attached drawings, in which:

FIG. 1 shows a very diagrammatical view of an example of a dry vacuum pump.

FIG. 2 shows a partial cross-sectional view of a portion of the vacuum pump in FIG. 1, showing in particular a sealing device.

FIG. 7 shows a perspective view of a sleeve of the sealing device in FIG. 2.

FIG. 8 shows a cross-sectional view of the sleeve in FIG. 7.

FIG. 9 shows a similar view to FIG. 3 of a second embodiment of the deflector.

FIG. 10 shows a similar view to FIG. 3 of a third embodiment of the deflector.

In the figures, identical elements have the same reference numbers. The drawings in the figures are simplified for ease of understanding.

Figure 3:
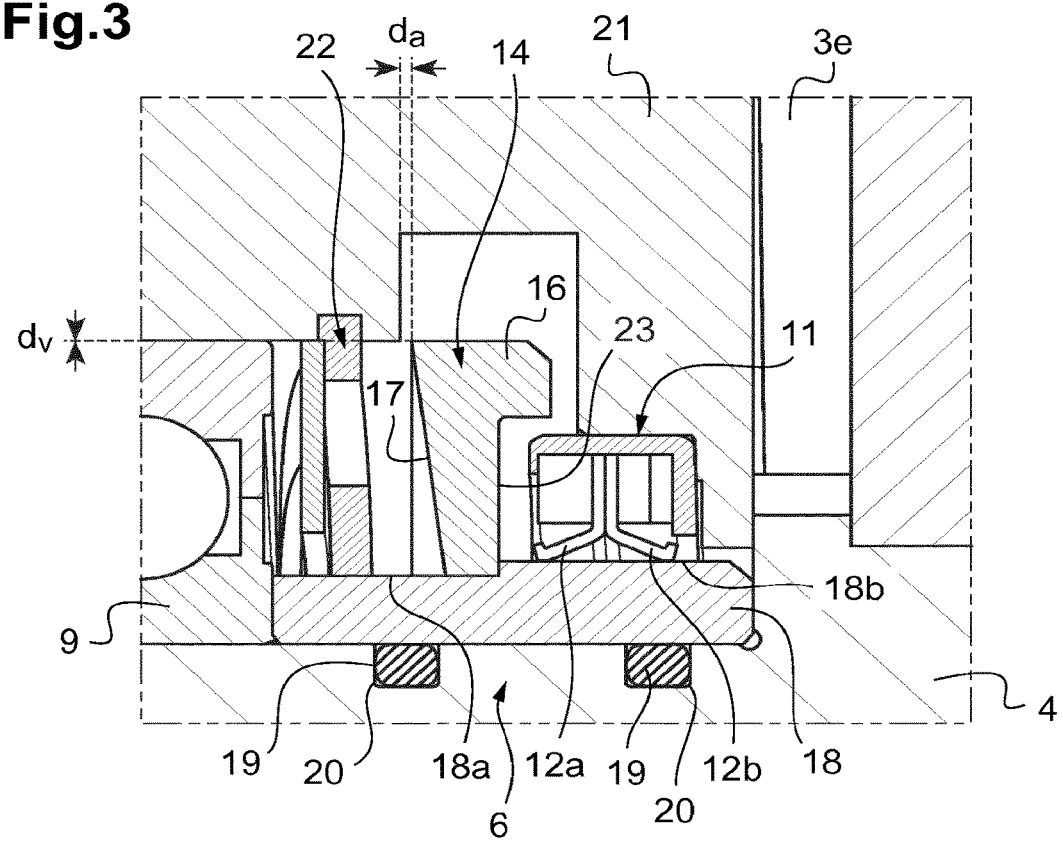
FIG. 3 shows an enlarged view of a detail of the sealing device in FIG. 2.

The following embodiments are examples. Although the description refers to one or more embodiments, this does not necessarily mean that each reference relates to the same embodiment, or that the features only apply to a single embodiment. Simple features of different embodiments can also be combined or interchanged to provide other embodiments.

FIG. 1 shows a dry vacuum pump 1.

The vacuum pump 1 comprises at least one oil sump 2, at least one pumping stage 3a-3e, two rotating shafts 4 and at least one lubricant sealing device 6 inserted between the oil sump 2 and a pumping stage 3e.

The shafts 4 respectively hold at least one rotor 5 extending in the at least one pumping stage 3a-3e.

In the illustrative example, the vacuum pump 1 comprises several pumping stages 3a, 3b, 3c, 3d, 3e, such as five, mounted in series between an intake 7 and a discharge 8 of the vacuum pump 1, and in which a gas to be pumped can flow. Here, the pumping stage 3e adjacent to the sealing device 6 is the last pumping stage 3e (known here as the "high-pressure" pumping stage as it is configured to discharge the pumped gases at atmospheric pressure).

Each pumping stage 3a, 3b, 3c, 3d, 3e comprises a respective input and output. The successive pumping stages 3a-3e are connected in series one after another by respective inter-stage channels connecting the output of the previous pumping stage to the input of the next pumping stage.

The rotors 5 have for example lobes with identical profiles, for example Roots (eight- or bean-shaped cross-section) or claw type, or are screw rotors or based on another similar positive displacement vacuum pump principle.

The rotors 5 with lobes with identical profiles are angularly offset. The rotors 5 are driven so that they rotate in a synchronised manner in opposite directions in each stage in order carry a gas to be pumped between the intake 7 and the discharge 8. During rotation, the gas taken in from the input is trapped in the space created by the rotors 5 and the stator, and is then carried by the rotors 5 to the next stage.

The vacuum pump 1 is for example a rough-vacuum pump, the discharge pressure of the vacuum pump 1 thus being atmospheric pressure. According to another example, the vacuum pump 1 is a Roots pump known as a Roots blower that is used in series with and upstream of a rough-vacuum pump.

The shafts 4 are driven, for example on the discharge side 8, by a motor M of the vacuum pump 1. They are supported by bearings lubricated by a lubricant contained in the oil sump 2. The lubricant, such as oil, makes it possible to lubricate in particular the ball bearings 9 of the bearings, and the gears (FIG. 2).

A lubricant sealing device 6 is inserted between the oil sump 2 and a pumping stage 3e at each shaft passage. There is therefore a sealing device 6 on the drive shaft 4 and a sealing device on the driven shaft 4.

As can be seen more clearly in FIG. 2, the sealing device 6 can comprise at least one ring seal 11.

The ring seal 11 comprises for example a "dynamic" seal, i.e. a non-friction seal, such as a segmented seal, a labyrinth seal or a chicane or a gas "wall", or a friction ring seal, such as a lip seal, or a combination of these embodiments. The ring seal 11 creates very low conductance around the rotating shafts 4, which makes it possible to greatly restrict the passage of the lubricants from the sump 2 to the dry pumping stages 3a-3e and vice versa, while allowing the shafts 4 to rotate.

In the examples shown in FIGS. 1 to 11, the ring seal 11 is a friction seal.

The friction ring seal 11 comprises for example a ring with two lips 12a, 12b (FIG. 3).

Figure 12:
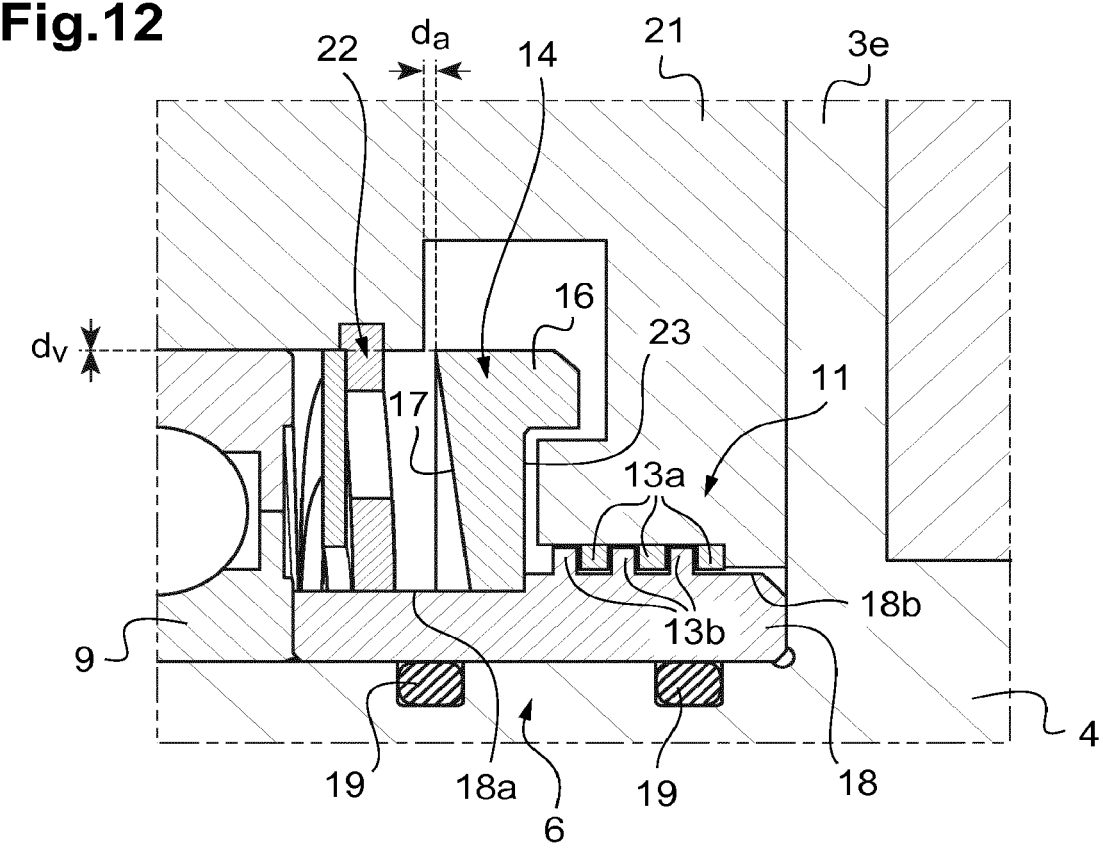
FIG. 12 shows a similar view to FIG. 3 of a second embodiment of the ring seal.

FIG. 12 shows another example in which the ring seal 11 is a dynamic seal comprising a segmented seal.

The segmented seal comprises one or more rings 13a rigidly mounted in the stator 21. A small clearance of in the order of a few tenths separates these fixed rings 13a from complementary rings 13b mounted on the shaft 4 for rotation therewith, to provide a seal at the shaft passages.

Figure 4:
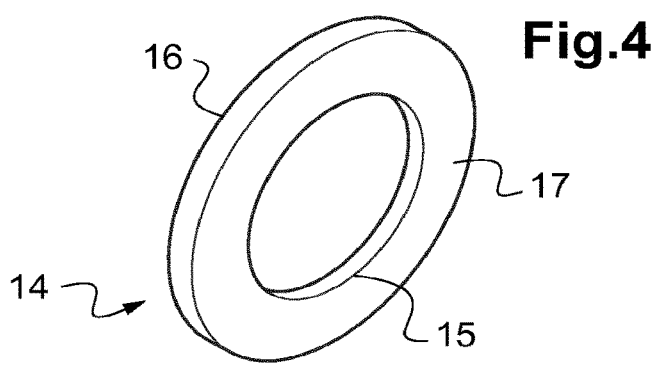
FIG. 4 shows a perspective view of a deflector of the sealing device in FIG. 2.

The sealing device 6 also comprises a generally disc-shaped deflector 14 mounted on the shaft 4 for rotation therewith (FIGS. 2, 3 and 4). The disc has a central orifice 15 for mounting on the shaft 4. The centrifugal force created by the rapid rotation of the deflector 14 restricts the progress of oil towards the ring seal 11.

An oil recovery channel 10 can be made in the stator 21 to return the lubricants to the oil sump 2 (FIG. 2). The entrance to the oil recovery channel 10 is for example made opposite the deflector 14 in a lower portion of the stator 21. There is for example a first oil recovery channel 10 opposite the deflector 14 of the drive shaft 4 and a second oil recovery channel 10 opposite the deflector 14 of the driven shaft 4.

The disc of the deflector 14 can also have an annular end 16 on its periphery, extending towards the pumping stage 3e, forming a retaining recess. The retaining recess makes it possible to retain any particles or dust that might come from the pumping stages 3a-3e of the vacuum pump 1 or from the friction ring seals 11 and would be ejected radially by the face 23 of the deflector 14. The migration of the particles towards the bearings 9 or oil sump 2 is thus prevented.

The deflector 14 is for example made from steel.

Figure 5:
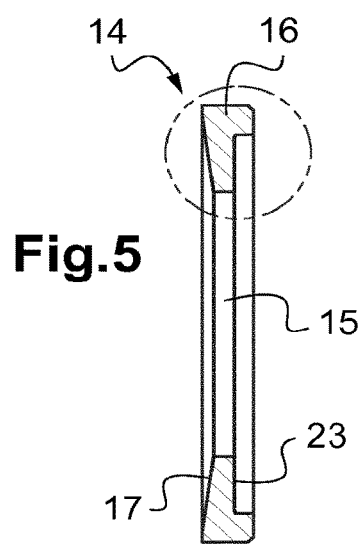
FIG. 5 shows a cross-sectional view of the deflector in FIG. 4.
Figure 6:
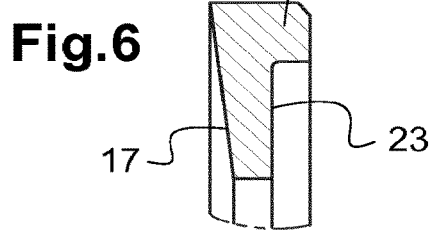
FIG. 6 shows an enlarged view of a detail of FIG. 5.

According to a first embodiment, the annular end 16 has a generally cylindrical shape, coaxial with the axis of rotation I-I of the shaft 4 (FIGS. 2, 5 and 6). The annular end 16 thus extends perpendicular to the disc of the deflector 14 in a direction parallel to the axis of rotation I-I. The retaining recess is thus generally cylindrical.

According to one embodiment, the annular end 16 of the deflector 14 extends at least partially around the ring seal 11 inserted between the deflector 14 and the pumping stage 3e (FIGS. 2 and 3). In other words, the annular end 16 at least partially covers the ring seal 11.

In the example shown in FIGS. 2 and 3, the ring seal 11 is partially clear of a cavity of the stator 21 of the vacuum pump 1, in which the back of the ring is for example embedded. The ring of the ring seal 11 has an approximately parallelepipedal cross-section, for example. A chicane can thus be formed between the stator 21 and the annular end 16 of the deflector 14 and between the retaining recess of the deflector 14 and the fixed portion of the ring seal 11.

In the example shown in FIG. 12, the prominent shape of the ring seal 11 protruding into the retaining recess of the deflector 14 is formed by the stator 21 at the fixed portion of the segmented seal (FIG. 12).

This chicane contributes to the retention of the particles from the pumping stages 3a-3e in the retaining recess of the deflector 14.

The sealing device 6 can also comprise a sleeve 18 mounted on the shaft 4 and on which the deflector 14 is mounted (FIGS. 3 and 7).

The seal between the sleeve 18 and the shaft 4 is provided by means of at least one O-ring 19, for example two, mounted in series on the shaft 4 in annular grooves 20 made in the shaft 4 (FIG. 3). The sleeve 18 is held on the shaft 4 and the shaft 4 is held in its bearings for example by means of prestressed spring washers 22 inserted between the sleeves 18 and the stator 21.

The sleeve 18 has for example a two-stage cylindrical shape, including a first cylindrical stage 18a the outer diameter of which is suitable for being inserted into the central orifice 15 in the deflector 14 and a second cylindrical stage 18b forming an axial stop for the deflector 14 (FIGS. 3 and 7). According to another embodiment, the sleeve 18 and the deflector 14 are made in a single piece.

The lips 12a, 12b of the ring seal 11 rub for example on the cylindrical second stage 18b of the sleeve 18. One end of a first lip 12a can be oriented towards the oil sump 2 and one end of a second lip 12b can be oriented towards the pumping stage 3e. The lips 12a, 12b can also be oriented in the same direction, towards the oil sump 2 or towards the pumping stage 3e, depending on the application.

In the example in FIG. 12, the complementary rings 13b of the segmented seal are formed in the sleeve 18.

The sleeve 18 makes it possible in particular to mount the deflector 14 on the shaft 4.

The sleeve 18 is for example made from steel and the outer surface of the sleeve 18 can be treated, for example by heat treatment such as quenching and/or tempering, followed by a grinding operation. This type of treatment makes it possible to obtain a surface state and hardness compatible with the operating specifications of the friction ring seals 11.

According to one embodiment, the face 17 of the deflector 14 facing the oil sump 2, opposite the face bearing the annular end 16, has a truncated cone shape, coaxial with the centre of the deflector 14 and the outside of the truncated cone faces towards the pumping stage 3e (FIGS. 2, 3, 4 and 5).

During operation, the "re-entrant" truncated cone shape of the deflector 14 in rotation guides the return to the oil sump 2 of the splashes of lubricant hitting the deflector 14.

In addition, provision can be made for an axial distance $d_a$, in a direction parallel to the axis of rotation I-I, of less than 3 mm and vertical distance $d_v$, in the direction perpendicular to the axis of rotation I-I, of less than 3 mm, to separate the stator 21 from an edge of the face 17 of the deflector 14 opposite the face bearing the annular end 16 (FIG. 3).

For example, two adjacent cylindrical cavities are made in the stator 21. A first cylindrical cavity has a diameter of the same order of magnitude as the diameter of the deflector 14 so that the vertical distance $d_v$ is less than 0.5 mm. A second adjacent cylindrical cavity, that receives the deflector 14, has a larger diameter. The axial distance $d_a$ separating the stator 21 from the edge of the face 17 of the deflector 14 is for example in the order of 1 mm. The passage thus formed is very narrow between the stator 21 and the deflector 14. It permits the relative expansion of the parts without the parts touching each other, while creating low conductance for the lubricants, thus restricting the migration thereof beyond the deflector 14.

During operation, the deflector 14, mounted on the shaft 4 for rotation therewith, rotates at the same rotating speed as the shaft 4.

The centrifugal force created by the rapid rotation of the deflector 14 and the truncated cone shape of the face 17 of the deflector 14 opposite the oil sump 2, project any lubricants that might come from the oil sump 2 and hit the deflector 14 towards the oil sump 2. The progress of the lubricants towards the pumping stage 3e is thus restricted, which makes it possible to improve the lubricant-tightness in the pumping stages 3a-3e.

The annular end 16 of the deflector 14 retains any particles or dust that might come from the pumping stages 3a-3e in the retaining recess, thus restricting the progress of the particles towards the oil sump 2. The contamination of the oil in the sump 2 can thus be reduced, which makes it possible to increase the lifespan of the ball bearings 9 and reduce oil consumption. A reduction in oil consumption in the order of 30% and "clear" oil almost entirely free from contaminating particles have thus been able to be observed after 1,000 operating hours of a vacuum pump 1 containing such a deflector 14.

The deflector 14 made in this way is simple to manufacture and inexpensive. It is compatible with different types of "dynamic" or friction ring seals 11.

FIG. 9 shows a second embodiment of the deflector 24.

In this second embodiment, the annular end 16 has a radial rim 25. The radial rim 25 extends approximately perpendicular to the axis of rotation I-I of the shaft 4. It makes it possible to improve the capacity for the retention of the particles and dust radially ejected by the deflector 24 in the retaining recess.

In these first two embodiments, the face 23 of the disc bearing the annular end 16 is perpendicular to the axis of rotation I-I.

FIG. 10 shows a third embodiment of the deflector 26 in which the face 27 of the disc bearing the annular end 16 has a general truncated cone shape, coaxial with the centre of the deflector 26 and the outside of the truncated cone faces towards the oil sump 2.

The annular end 16 can be cylindrical, optionally provided with a radial rim 25 as in the examples described above, or can have other shapes such as a bevelled shape as shown in FIG. 10.

During operation, the centrifugal force created by the rapid rotation of the deflector 26 and the truncated cone shape of the face 27 of the deflector 26 opposite the pumping stage 3e, make it possible to guide the return to the pumping stage 3e of any particles or dust that might come from the pumping stage 3e that are not trapped in the retaining recess.

Figure 11:
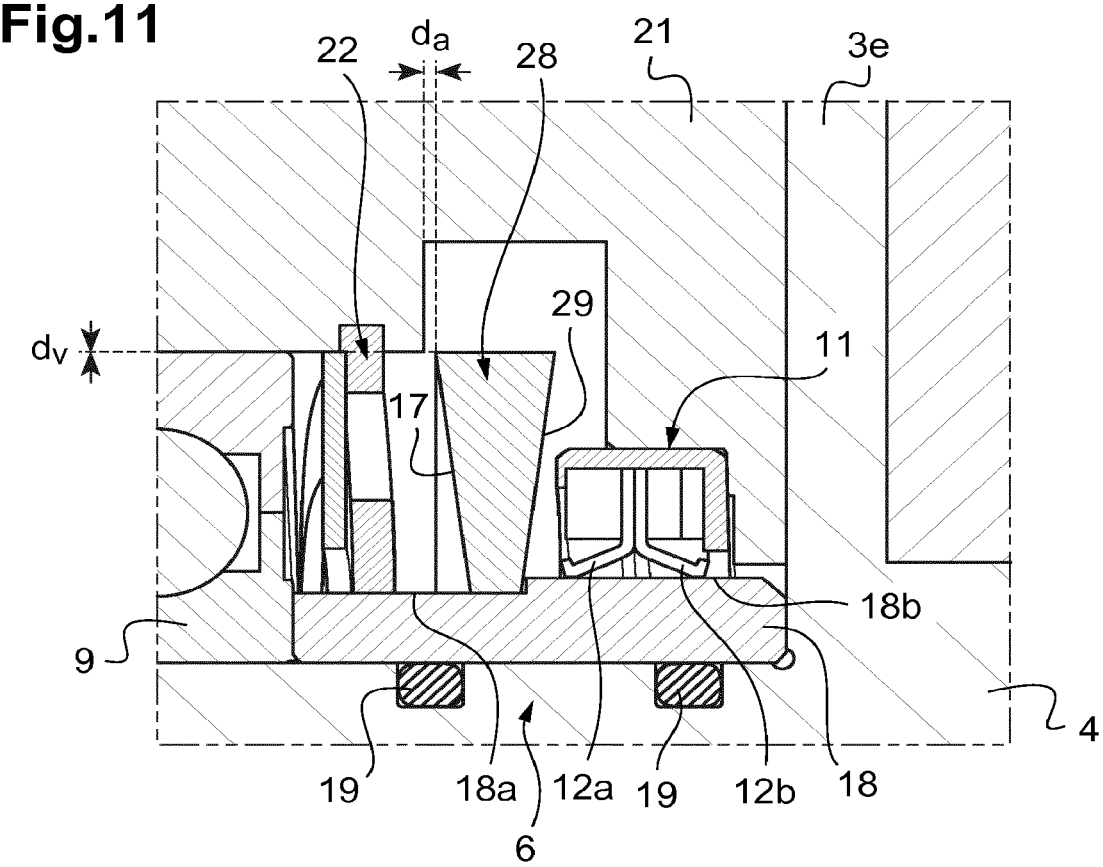
FIG. 11 shows a similar view to FIG. 3 of a fourth embodiment of the deflector.

FIG. 11 shows a fourth embodiment of the deflector 28.

This embodiment differs from those above in the fact that the deflector 28 does not have an annular end 16.

In this example, the disc of the deflector 28 comprises at least one face 17, 29 having a truncated cone shape, coaxial with the centre of the deflector 28.

Just one face can have a truncated cone shape, and the other face can be perpendicular to the axis of rotation I-I of the shaft 4.

The face 29 of the deflector 28 having a truncated cone shape is for example the face opposite the pumping stage 3e, the outside of the truncated cone shape facing towards the oil sump 2.

The face 17 of the deflector 28 having a truncated cone shape can for example be the face opposite the oil sump 2, the outside of the truncated cone shape facing towards the pumping stage 3e.

Both faces of the deflector 28 can have a truncated cone shape (FIG. 11).

During operation, the truncated cone shape of the face 17 opposite the oil sump 2 makes it possible to guide the return to the oil sump 2 of any lubricants that might come from the oil sump 2 and hit the deflector 28. The truncated cone shape of the face 29 opposite the pumping stage 3e makes it possible to guide the return to the pumping stage 3e of any particles or dust that might come from the pumping stage 3e.

The invention claimed is:

1. A dry vacuum pump, comprising:
   at least one oil sump;
   at least one pumping stage;
   two rotating shafts respectively holding at least one rotor extending in the at least one pumping stage, the at least one rotor on each of the respective two shafts are configured to rotate in a synchronized manner in opposite directions with respect to one another in order to carry a gas to be pumped between an intake and a discharge of the dry vacuum pump, the two rotating shafts being supported by bearings lubricated by a lubricant contained in the at least one oil sump; and
   at least one lubricant sealing device inserted between the at least one oil sump and a pumping stage of the at least one pumping stage at each shaft passage, the at least one lubricant sealing device including a deflector mounted on each shaft of the two rotating shafts for rotation therewith,
   wherein the deflector comprises a flat circular portion with an annular end on a periphery thereof, extending towards the at least one pumping stage, forming a retaining recess, and
   wherein the annular end has a radial rim.

2. The dry vacuum pump according to claim 1, wherein the at least one lubricant sealing device comprises a ring seal, the annular end of the disc shaped deflector extending at least partially around the ring seal.

3. The dry vacuum pump according to claim 1, wherein the at least one lubricant sealing device comprises a sleeve mounted on each shaft of the two rotating shafts, the deflector being mounted on the sleeve.

4. The dry vacuum pump according to claim 3, wherein the sleeve has a two-stage cylindrical shape, including a first cylindrical stage, an outer diameter of which is configured to be inserted into a central orifice in the deflector, and a second cylindrical stage forming an axial stop for the deflector.

5. The dry vacuum pump according to claim 1, wherein the at least one lubricant sealing device comprises a ring seal.

6. The dry vacuum pump according to claim 5, wherein the ring seal is a ring with a single lip or double lips, or is a segmented seal.

7. A dry vacuum pump, comprising:
   at least one oil sump;
   at least one pumping stage;
   two rotating shafts respectively holding at least one rotor extending in the at least one pumping stage. the at least one rotor on each of the respective two shafts are configured to rotate in a synchronized manner in opposite directions with respect to one another in order to carry a gas to be pumped between an intake and a discharge of the dry vacuum pump, the two rotating shafts being supported by bearings lubricated by a lubricant contained in the at least one oil sump; and
   at least one lubricant sealing device inserted between the at least one oil sump and a pumping stage of the at least one pumping stage at each shaft passage, the at least one lubricant sealing device including a deflector mounted on each shaft of the two rotating shafts for rotation therewith, wherein the deflector comprises a flat circular portion with an annular end on a periphery thereof, extending towards the at least one pumping stage, forming a retaining recess, and wherein a face of the deflector bearing the annular end has a truncated cone shape, coaxial with a center of the deflector.

8. The dry vacuum pump according to claim 7, wherein the annular end has a substantially cylindrical shape, coaxial with an axis of rotation of the shaft of the respective shaft of the two rotating shafts.

9. A dry vacuum pump, comprising:
at least one oil sump;
at least one pumping stage;
two rotating shafts respectively holding at least one rotor extending in the at least one pumping stage, the at least one rotor on each of the respective two shafts are configured to rotate in a synchronized manner in opposite directions with respect to one another in order to carry a gas to be pumped between an intake and a discharge of the dry vacuum pump, the two rotating shafts being supported by bearings lubricated by a lubricant contained in the at least one oil sump; and
at least one lubricant sealing device inserted between the at least one oil sump and a pumping stage of the at least one pumping stage at each shaft passage, the at least one lubricant sealing device including a deflector mounted on each shaft of the two rotating shafts for rotation therewith, wherein the deflector comprises a flat circular portion with an annular end on a periphery thereof, extending towards the at least one pumping stage, forming a retaining recess, and wherein the deflector comprises a face opposite a face bearing the annular end, having a truncated cone shape, coaxial with a center of the deflector.

10. A dry vacuum pump, comprising:
at least one oil sump:
at least one pumping stage;
two rotating shafts respectively holding at least one rotor extending in the at least one pumping stage. the at least one rotor on each of the respective two shafts are configured to rotate in a synchronized manner in opposite directions with respect to one another in order to carry a gas to be pumped between an intake and a discharge of the dry vacuum pump, the two rotating shafts being supported by bearings lubricated by a lubricant contained in the at least one oil sump: and
at least one lubricant sealing device inserted between the at least one oil sump and a pumping stage of the at least one pumping stage at each shaft passage, the at least one lubricant sealing device including a deflector mounted on each shaft of the two rotating shafts for rotation therewith, wherein the deflector comprises a flat circular portion with an annular end on a periphery thereof, extending towards the at least one pumping stage, forming a retaining recess, and wherein an axial distance of less than 3 mm and a vertical distance of less than 3 mm separate a stator of the dry vacuum pump from an edge of a face of the deflector opposite a face bearing the annular end.

\* \* \* \* \*